United States Patent [19]
Papineau

[11] Patent Number: 4,943,799
[45] Date of Patent: Jul. 24, 1990

[54] PORTABLE ALARM SYSTEM WITH SEALED ENCLOSURE

[76] Inventor: Robert Papineau, 8467 Place Choquette, St-Leonard P.Q., Canada

[21] Appl. No.: 319,176

[22] Filed: Mar. 3, 1989

[51] Int. Cl.[5] .......................... G08B 19/00; H04M 11/00

[52] U.S. Cl. .......................... 340/521; 340/531; 340/539; 340/546; 340/541; 340/555; 340/693; 370/40; 370/44

[58] Field of Search ............... 340/521, 531, 539, 546, 340/540, 541, 555, 556, 586, 693; 379/37-44

[56] References Cited

U.S. PATENT DOCUMENTS

| | | | |
|---|---|---|---|
| 4,560,978 | 12/1985 | Lemelson | 340/531 |
| 4,602,246 | 7/1986 | Jensen | 340/531 |
| 4,742,336 | 5/1988 | Hall et al. | 340/531 |

*Primary Examiner*—Donnie L. Crosland

[57] ABSTRACT

A portable alarm system includes a compact portable sealed housing having an electronic alarm control circuit therein. An electrical a.c. cord supplies power to the control circuit and plugs into the housing. A telephone jack connects a telephone circuit to a dialer circuit within the control circuit. A digital key pad is secured to the housing and has a plurality of switches actuable exteriorly of the housing whereby to program the control circuit by a lessor person and for actuating or deactuating the control circuit by a lessee user person. A receiver circuit is also provided in the housing and is connected to the control circuit. One or more wireless infrared detectors are detachably secured to the housing and positioned to detect moving objects within an environment to be protected. The detectors have infrared transmitters, of different frequencies, and transmit alarm signals to the receiver. The receiver has a first channel which is responsive to a first detector and is connected to the control circuit through a delay circuit so that the control circuit only switches to an alarm state to generate an alarm code on the telephone line after a predetermined time delay. The second channel of the receiver has no delay circuit. A siren is connected to the control circuit and secured to the housing to generate an audible local alarm upon activation of the control circuit to the alarm state.

10 Claims, 2 Drawing Sheets

PORTABLE ALARM SYSTEM WITH SEALED ENCLOSURE

BACKGROUND OF INVENTION (a) Field of the Invention

The present invention relates to an improved portable alarm system which is contained within a sealed housing and on which there is provided a key pad for temporarily adapting the alarm system to a particular lessee user and permitting the user to actuate or deactuate the control circuit within the sealed housing. The control circuit also transmits a user information code to a central control station to identify the source of the alarm signal.

(b) Description of Prior Art

Various portable alarms are known such as described, for example, in U.S. Pat. No. 3,551,906 which discloses an alarm circuit housed within a container which resembles a lunch box so that the alarm system is concealed or non-detectable. A clasp-type lock is mounted on the front wall of the cover to securely lock the cover in a closed position to prevent access to the interior of the container. However, if the lock is tampered with, the cover can be opened and the alarm disconnected. An on/off switch is located within the container and accessible when the cover is open. Accordingly, the alarm system can be tampered with.

U.S. Pat. No. 4,742,336 describes a very similar system and wherein the alarm is provided in a portable briefcase. The briefcase is also provided with hinges and latch elements and a lock to open the case whereby to remove intrusion detecting devices therefrom as well as the connecting electrical cords for the power and telephone lines. Another such type portable alarm is also described in U.S. Pat. No. 4,319,228. Again, the user has access to the circuitry and the alarm system can be tampered with.

Another disadvantage of these prior art devices is that a key is required for use of the device. If the key is lost or misplaced, the device cannot be utilized.

SUMMARY OF INVENTION

It is an object of the present invention to provide a novel portable alarm system wherein all of the electronics including the control circuit, siren connections, power connections and telephone connections to the control circuit are located within a sealed housing and cannot be tampered with by the authorized lessee user or a burglar.

Another object of the present invention is to provide a portable alarm system comprising a compact portable sealed housing having infrared detectors detachably secured thereto and wherein the electronic control circuit within the sealed housing is actuated through a code generated by a plurality of switches located on a key pad secured to a wall of the housing.

Another object of the present invention is to provide a portable alarm system comprising a compact portable sealed housing equipped with a key pad and wherein the housing is provided with a heat detector as well as a low temperature detector for detecting dangerous temperature levels within the immediate area where the housing is located and generate alarms representative thereof.

Another object of the present invention is to provide a portable alarm system having a compact portable sealed housing with an electronic alarm control circuit therein and wherein the control circuit is conditioned by a lessor proprietor by depressing switches on a key pad provided on the housing wall.

Summarizing the invention, I provide a portable alarm system comprising a compact portable sealed housing having an electronic alarm control circuit secured inside the housing. A power supply transformer is located in the housing and connected between the control circuit and an a.c. terminal connector secured to the housing. A telephone jack is secured to the housing and to a dialer circuit of the control circuit and to a telephone line jack. An auxiliary d.c. supply is mounted in the housing with an automatic switching device connected thereto to supply the control circuit upon detecting a predetermined supply condition. A digital key pad is secured to the housing and has a plurality of switches actuable exteriorly of the housing for programming the control circuit by a lessor person and for actuating or deactuating the control circuit by a lessee user. A receiver circuit is also located in the housing and connected to the control circuit. One or more wireless infrared detectors are provided for detecting moving objects and are removably secured to the housing. The detectors have infrared transmitters, of different frequencies, to transmit to the receiver circuits alarm signals. The receiver has a first channel which is responsive to a first detector and is connected to the control circuit through a delay circuit means so that the control circuit only switches to an alarm state to generate an alarm code on the telephone line after a predetermined time delay. A siren is connected to the control circuit and secured to the housing to generate an audible local alarm upon activation of the control circuit to the alarm state.

BRIEF DESCRIPTION OF DRAWINGS

The invention will now be described with reference to the drawings in which.

DESCRIPTION OF PREFERRED EMBODIMENTS

Figure 2:
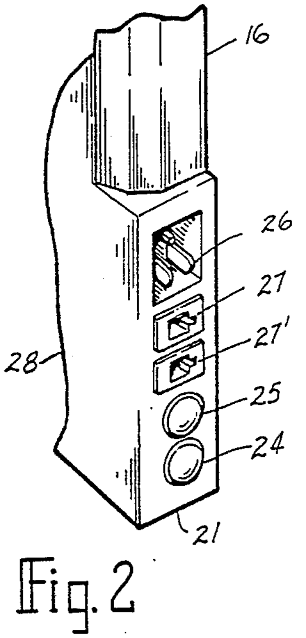
FIG. 2 is a fragmented perspective bottom side view of the housing.
Figure 1:
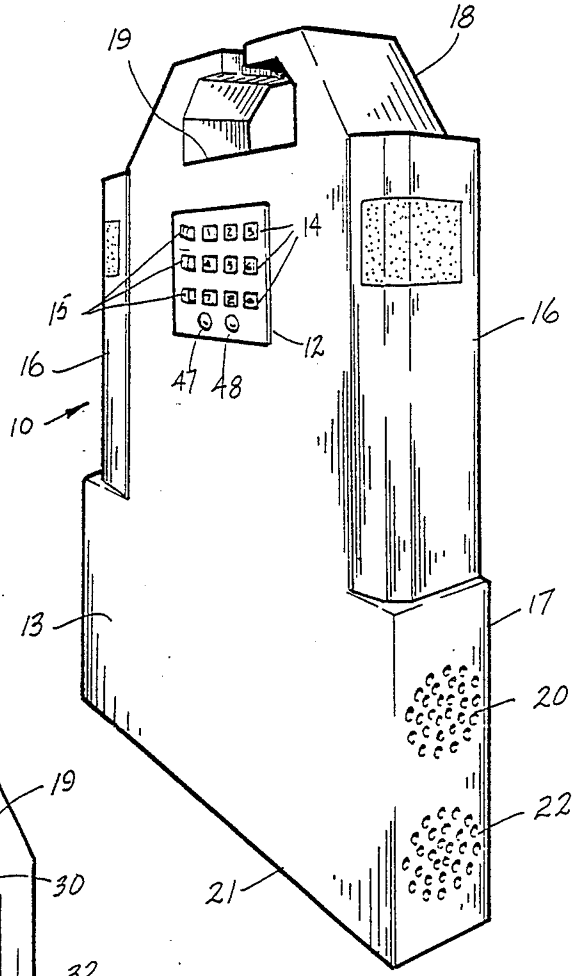
FIG. 1 front perspective view of the portable alarm housing.

Referring to FIGS. 1 to 4, there is shown a compact portable sealed housing 10 in which is housed an electronic alarm control circuit 11 of a type known in the art and to which is connected various electronic components as will be described later with reference to FIG. 5. A digital key pad 12 is secured to a front wall 13 of the housing and has a first group of push button switches 14 to permit a lessor person who is the proprietor of the alarm to program the control circuit 11 to accept a lessee user code which is keyed in using the second series of push button switches 15. One or more, herein a pair, of wireless infrared detectors 16 are detachably secured to a respective one of the end walls 17 of the housing. A carrying handle 18 is provided in the top wall 19 of the housing for carrying same. The bottom wall 21 is flat so that the housing may rest on a support surface.

One of the end walls 17 is provided with a perforated area 22 behind which is secured a siren 23 (see FIG. 5).

A vent hole 20 is also provided in one or both end walls 17. A low temperature detector 24 and a heat detector 25 are also provided in the other end wall 17. An a.c. connecting plug 26 and a pair of telephone jacks 27 and 27' are further secured to this end wall 17. In use, the housing 10 is laid on its bottom wall 21 or back wall 28 for access to the connectors 26, 27 and 27'.

Figure 3:
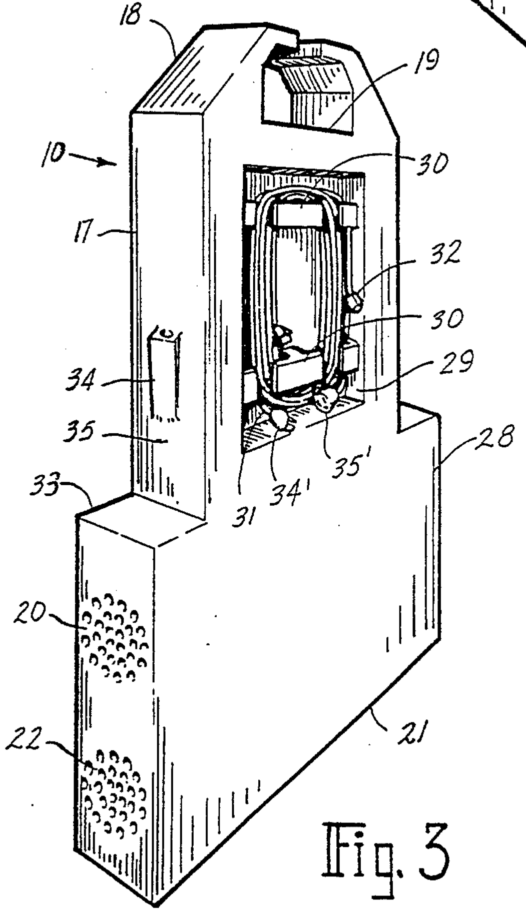
FIG. 3 is a rear perspective view of the housing.

As shown in FIG. 3, the back wall 28 is provided with a cavity 29 therein in which is disposed cable retention clamps 30 to retain an a.c. cord 31 and a telephone jack interconnection line 32. The end walls 17 are also provided with a recessed portion 33 and a flanged head slide connector 34 which protrudes from the side wall 35 of the cavity to attach an infrared detector 16 thereto. Accordingly, the housing is compact and portable with only a few accessories being conveniently attached thereto making the portable alarm system easy to install.

Figure 4:
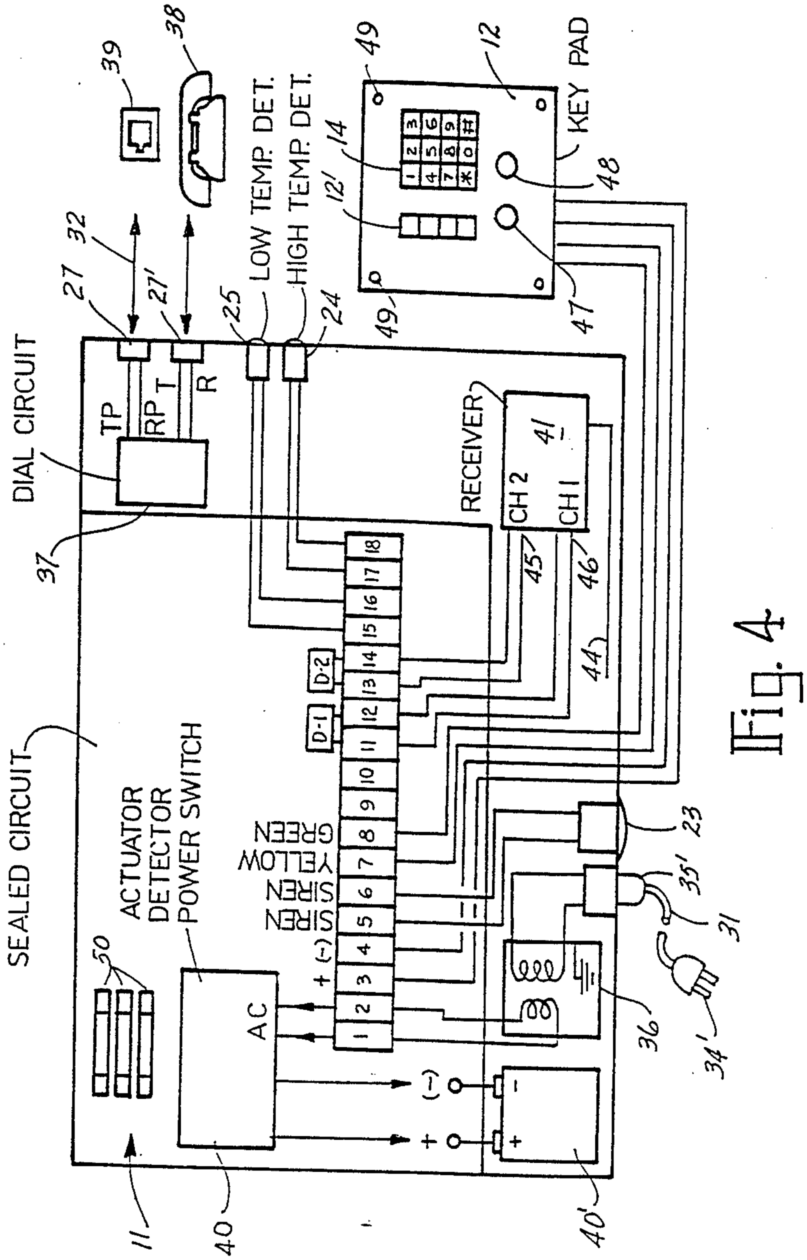
FIG. 4 a wiring diagram showing the connection of the various elements to the control circuit.

Referring now to FIG. 4, there is shown all of the electrical devices secured in or to the sealed housing 10 and their interconnection to the control circuit 11 therewithin. Secured inside the housing 10 is a 12-volt d.c. battery 40' which acts as an auxiliary supply in the event there is a local power failure. The power cord 31 is provided with opposed electrical end plugs 34 and 35 with one end plug connecting into the electrical socket 26 in the side wall 21 of the housing 10 and the other plug connecting into a wall electrical outlet (not shown). The electrical connector 26 also connects to a step-down transformer 36 located within the housing to supply the necessary low voltage to the various component parts of the alarm control circuit 11, in a manner well known in the art. An actuator/detector power switch circuit 40 detects failure in the a.c. supply and automatically switches to the d.c. battery 40'. The telephone jack 27 also connects to a dialer circuit 37 provided in the control circuit whereby to dial an alarm code to a designated control office which identifies the code with the specific housing 10 and the present authorized user. The other jack 27' is provided to connect to the telephone 38 which is usually connected to the wall jack 39, thus permitting the telephone to be used via the jack 27' and its internal connection back to the jack 27 and the wall unit 39.

A receiver circuit 41 is also provided in the housing and interconnected with the control circuit 11. Each of the infrared detectors 16 is also provided with an infrared transmitter 42 therein with the transmitters operating at different frequencies from one another. In use, the infrared detectors are located remotely from the housing 10 and detect movement. When a movement is detected, the transmitter 42 sends a signal to the housing 10 which is identified by the receiver 41. One of the channels of the receiver is connected to the control circuit through a delay circuit 43 and after a predetermined time delay, if the transmitted signal persists, then the control circuit will switch to an alarm state sending an alarm signal on the telephone line 32 connected to the wall jack 39 and to the control station. The detector associated with the delay channel of the receiver is utilized by the user in the area closest to the housing 10 to give sufficient time to the user to arm the alarm before vacating the premises being guarded and to shut off the alarm during re-entry.

When the siren 23 is energized, it emits an alarm sound in the immediate area. The receiver 41 is provided with an antenna 44 and two channels 45 and 46 each channel indicating which of the transmitters 42 and 42' have sent a detection signal so that the intrusion can be pinpointed to the area where its associated detector is located.

The heat detector 25 is provided to sense a fire condition in the area where the housing is disposed. The heat detector is connected to the control circuit which generates an alarm signal through the telephone line 32 when the ambient temperature exceeds a predetermined value. Similarly, the low temperature detector 25 senses a predetermined low temperature in the ambient area and is also connected to the control circuit which generates an alarm signal on the telephone line 32 to indicate that the temperature has dropped to a critical low value. These signals are received at the control station and corrective action is immediately taken.

The digital key pad module 12 is also provided with a pilot light 47 to indicate that the power is switched on. A further pilot light 48 is provided to indicate that the circuit is armed. The key pad panel 12' is also secured to the front wall 13 of the housing by rivets 49 whereby to prevent the removal thereof and tampering. Also, the fuses 50 for the system are located inside the housing. It can thus be appreciated that the user has absolutely no access to the circuit and the only person that can program the control circuit of the alarm is the person associated with the remote control station. This particular alarm was conceived for temporary use by people who vacate premises for short durations. The user would rent the alarm system and the programmer or control person would give it an indication code which is programmed through the key pad 12 whereby the central station can recognize the location of the unit as well as its temporary user. Because of the fact that the unit is sealed, there are no keys to activate the unit, as is the case with similar units of the prior art and, therefore, there is no risk of not being able to utilize the unit if, for example, a key was lost or misplaced. Also, it is not possible for the user to tamper with the unit. Still further, all that is necessary for the user to do is to connect a telephone line and a power line to the unit. If the user wishes to use the telephone previously connected in the wall jack, all that he has to do is reconnect the telephone in the auxiliary jack of the housing.

I claim:

1. A portable alarm system comprising a compact portable sealed housing, an electronic alarm control circuit secured inside said housing, a power supply transformer in said housing connected between said control circuit and an AC terminal connector secured to said housing, a telephone jack secured to said housing and to a dialer circuit of said control circuit and to a telephone line jack, an auxiliary DC supply in said housing with an automatic switching device connected thereto to supply said control circuit upon detecting a predetermined supply condition, a digital key pad secured to said housing and having a plurality of switches actuable exteriorly of said housing for programming said control circuit which is contained within said sealed housing and unaccessible from the outside of said housing, and for actuating or deactuating said control circuit, a receiver circuit in said housing and connected to said control circuit, one or more wireless infrared detectors for detecting moving objects and removably secured to said housing; said detectors having infrared transmitters, of different frequencies from one another, to transmit to said receiver circuits alarm signals; said receiver having a first channel responsive to a first of said detectors and being connected to said control circuit through a delay circuit means so that said control circuit only switches to an alarm state to generate an alarm code on said telephone line after a predetermined time delay, the others of said detectors being directly connected to said control circuit, and a siren secured to said control circuit to generate an audible local alarm upon actuation of said control circuit to said alarm state.

2. A portable alarm system as claimed in claim 1 wherein said sealed housing is provided with detector attachment means to removably secure said one or more wireless infrared detectors thereto when said system is not in use.

3. A portable alarm system as claimed in claim 1 wherein there is further provided a heat detector secured to said housing for sensing an overheat condition in an area where said housing is disposed, said heat detector being connected to said control circuit which generates an alarm signal through a telephone line of a telephone connected to one of said jacks when ambient temperature exceeds a predetermined value.

4. A portable alarm system as claimed in claim 3 wherein there is further provided a low temperature detector secured to said housing for sensing a predetermined low temperature ambient condition, said low temperature detector being connected to said control circuit which generates an alarm signal on said telephone line when ambient temperature drops below a predetermined low temperature value.

5. A portable alarm system as claimed in claim 4 wherein there is provided a second telephone jack connected to said housing, said second jack being connectable directly to a telephone, said second jack being connected to said first jack and to said telephone line permitting use of said telephone when said control circuit is not armed.

6. A portable alarm system as claimed in claim 5 wherein said key pad is disposed on a side wall of said housing, a cavity in an opposed side wall and having a telephone connecting line and an a.c. connecting line disposed therein for connecting said system for use; said jacks, siren, a.c. terminal connector, heat detector and low temperature detector being secured in said bottom wall, said infrared detectors being removably secured to end walls of said housing.

7. A portable alarm system as claimed in claim 1 wherein said predetermined supply condition is an a.c. power failure, said automatic switching device having a supply detecting circuit to switch over to said d.c. supply, there being two infrared detectors operating on different frequencies, said control circuit being a digital integrated communicator circuit.

8. A portable alarm system as claimed in claim 7 wherein said digital key pad further includes a status indicating light and emergency code numbers for emergency automatic dialing.

9. A portable alarm system as claimed in claim 1 wherein said key pad is provided with a first series of programming pressure sensitive switches for use by said lessor person and a second series of pressure sensitive switches for operation by said lessee user person, said control circuit being protected by a special code introduced in a memory thereof by said lessor person.

10. A portable alarm system as claimed in claim 1 wherein said key pad is secured to said housing by non-removable fasteners to prevent access to inside said sealed housing, and a handle provided with said housing for hand transport thereof.

* * * * *